(12) United States Patent
Ziesel

(10) Patent No.: US 6,767,009 B2
(45) Date of Patent: Jul. 27, 2004

(54) CARBONATOR WITH TARGETED CARBONATION LEVEL

(75) Inventor: Lawrence B. Ziesel, Woodstock, GA (US)

(73) Assignee: The Coca-Cola Company, Atlanta, GA (US)

(*) Notice: Subject to any disclaimer, the term of this patent is extended or adjusted under 35 U.S.C. 154(b) by 79 days.

(21) Appl. No.: 10/015,584

(22) Filed: Dec. 17, 2001

(65) Prior Publication Data

US 2003/0111745 A1 Jun. 19, 2003

(51) Int. Cl.[7] .................................................. B01F 3/04
(52) U.S. Cl. ...................... 261/115; 261/117; 261/123; 261/DIG. 7
(58) Field of Search ............................ 261/115, 117, 261/118, 119.1, 123, DIG. 7

(56) References Cited

U.S. PATENT DOCUMENTS

| | | | |
|---|---|---|---|
| 2,271,896 A | | 2/1942 | Lewis |
| 2,735,665 A | | 2/1956 | Lance |
| 3,109,873 A | * | 11/1963 | Hotchkiss .................... 261/35 |
| 3,637,197 A | * | 1/1972 | Hudson .................... 261/122.1 |
| 4,764,315 A | * | 8/1988 | Brusa ...................... 261/140.1 |
| 5,002,201 A | * | 3/1991 | Hancock et al. .............. 222/61 |
| 5,417,147 A | * | 5/1995 | Mason ...................... 99/323.2 |
| 5,736,072 A | * | 4/1998 | Satoh ......................... 261/27 |
| 5,792,391 A | * | 8/1998 | Vogel et al. ............. 261/121.1 |
| 5,851,445 A | * | 12/1998 | Kazuma .................... 261/103 |
| 5,855,296 A | | 1/1999 | McCann et al. |
| 2003/0012849 A1 | * | 1/2003 | Berson ....................... 426/66 |

FOREIGN PATENT DOCUMENTS

| | | |
|---|---|---|
| GB | 1 560 753 | 2/1980 |
| GB | 2 052 713 A | 1/1981 |

* cited by examiner

Primary Examiner—Scott Bushey
(74) Attorney, Agent, or Firm—Finnegan, Henderson, Farabow, Garrett & Dunner, L.L.P.

(57) ABSTRACT

A carbonator for use in a beverage dispenser may include a tank having a first end and a second end. An inlet in the second end of the tank may be configured to receive a supply of $CO_2$. The carbonator may include a baffle in the tank between the first end and the second end and an orifice in the first end of the tank. The orifice may be structured and arranged to direct a stream of water into the tank. The baffle may be positioned in the tank so as to target a desired carbonation level of the water in the tank.

25 Claims, 4 Drawing Sheets

CARBONATOR WITH TARGETED CARBONATION LEVEL

BACKGROUND OF THE INVENTION

The invention relates to a system for mixing water with carbon dioxide ($CO_2$), for example, $CO_2$ gas, to produce carbonated water and, more specifically, to a carbonator with a targeted carbonation level for use in, for example, a post-mix beverage dispenser.

Some conventional carbonators used, for example, in post-mix beverage dispensers include a tank having a plain water inlet and a soda water outlet. These conventional carbonators may also include a supply of $CO_2$ that mixes with the plain water, resulting in carbonated water, or soda water. The soda water may be mixed with a syrup, or concentrate, and supplied to a dispensing nozzle associated with the post-mix beverage dispenser upon the demand of a user.

In some of these conventional carbonators, for example, chilled carbonators, a stream of plain water may be directed through the inlet and into a level of water existent in the tank in an effort to generate carbonated water. However, the impact of the stream of water with the water in the tank may cause undesirably high $CO_2$ volumes to develop in the tank. In addition, the water in the tank may be carbonated above desired levels, leading to valve sputtering and excessive foaming when dispensing a beverage.

Additionally, in some conventional carbonators, desired carbonation levels may not be maintained when the level of water in the tank reaches lower levels. For example, the stream of water may not entrain a desired amount of $CO_2$ when the level of water is low and/or a lack of mixing/agitation of the water in the

SUMMARY OF THE INVENTION

According to one aspect of the invention, a carbonator for use in a beverage dispenser may comprise a tank having a first end and a second end. An inlet in the second end of the tank may be configured to receive a supply of $CO_2$. The carbonator may include a baffle in the tank between the first end and the second end and an orifice in the first end of the tank. The orifice may be structured and arranged to direct a stream of water into the tank, and the baffle may be positioned in the tank so as to target a desired carbonation level of the water in the tank.

According to another aspect of the invention, a system for mixing water with $CO_2$ to produce carbonated water may comprise a tank containing water and a headspace. The tank may have a first end and a second end. The system may also comprise a source of $CO_2$ in fluid communication with the headspace, a baffle in the tank between the first end and the second end, an orifice in the first end of the tank, and a supply of water coupled to the orifice. The orifice may be structured and arranged to direct a stream of water into the tank, and the baffle may be positioned in the tank so as to target a desired carbonation level of the water in the tank.

According to yet another aspect of the invention, a method of mixing water with $CO_2$ to produce carbonated water with a targeting carbonation level may include supplying gaseous $CO_2$ to a headspace in a tank containing a volume of water to be carbonated. The headspace may be disposed above a liquid-gas interface between the water and the gaseous $CO_2$. The method may also include directing a stream of water first through the headspace to entrain $CO_2$ gas therein and then into the volume of water to carbonate the same to a desired carbonation level. The method may further include separating $CO_2$ bubbles formed in the quantity of water according to relatively large and small sizes.

According to still another aspect of the invention, a carbonator for use in a beverage dispenser may comprise a tank having at least one wall and being configured to contain water. The carbonator may include an inlet in the at least one wall of the tank configured to receive a supply of $CO_2$, a baffle in the tank spaced from the inlet, and an orifice in the at least one wall of the tank. The orifice may be structured and arranged to direct a stream of water into the tank. The baffle may be positioned in the tank so as to target a desired carbonation level of the water in the tank.

It is to be understood that both the foregoing general description and the following detailed description are exemplary and explanatory only and are not restrictive of the invention.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DETAILED DESCRIPTION OF THE INVENTION

Reference will now be made in detail to the exemplary embodiments of the invention, examples of which are illustrated in the accompanying drawings. Wherever possible, the same reference numbers will be used throughout the drawings to refer to the same or like parts.

Figure 1:
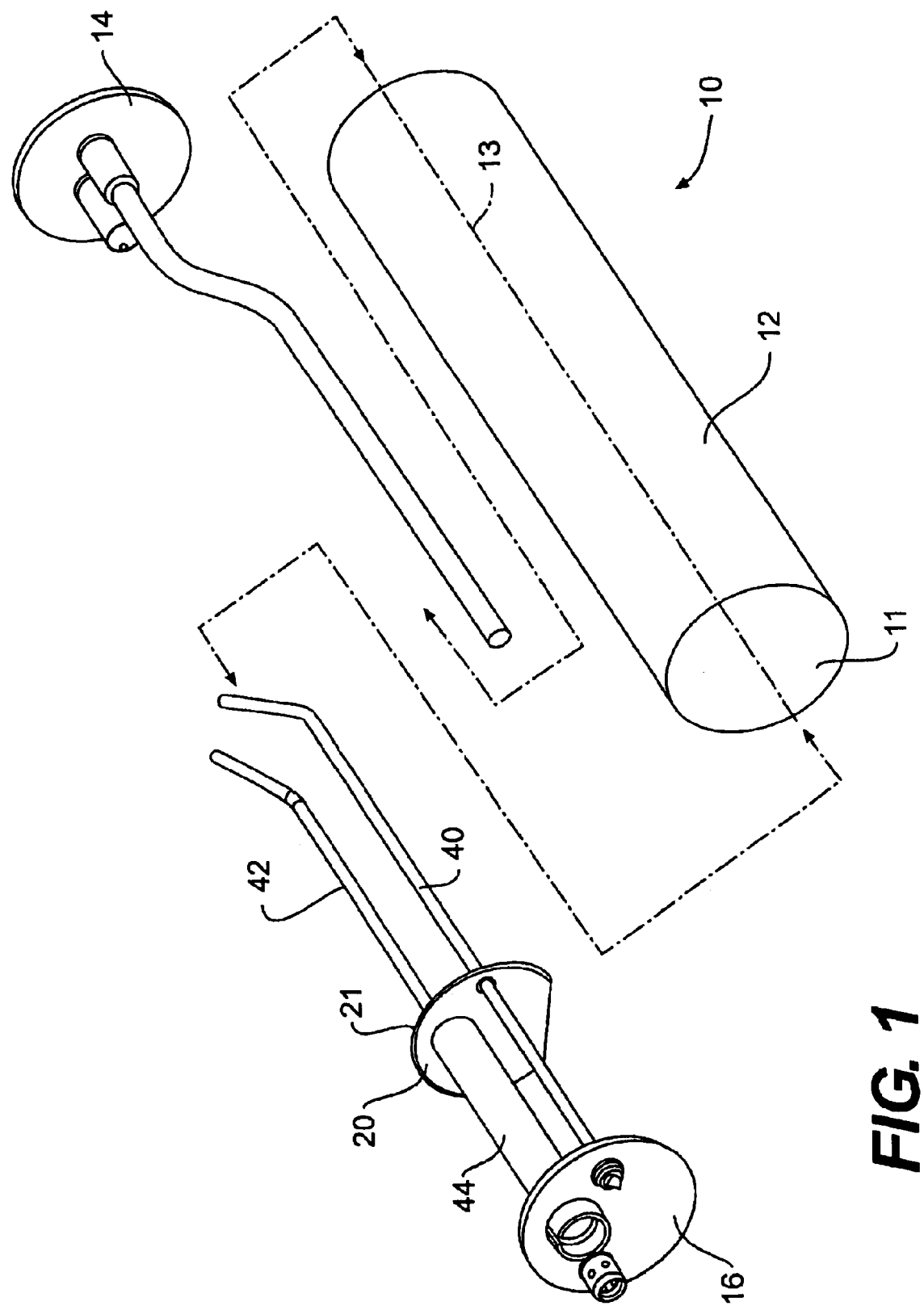
FIG. 1 is an exploded view of a carbonator in accordance with an exemplary embodiment of the invention.

In accordance with the invention, a carbonator for use in, for example, a post-mix beverage dispenser is provided. Referring to FIG. 1, a carbonator 10 may include a tank 12 having a first end wall 14 and a second, opposite end wall 16. The tank 12 may be, for example, generally-cylindrical. The tank 12 may have, for example, a circular cross-section. Alternatively, the tank 12 may have a non-circular cross-section, for example, oval, elliptical, square, triangular, or the like.

The carbonator 10 may also include a baffle 20 in the tank 12. The baffle 20 may be positioned between the first end wall 14 and the second end wall 16, dividing the tank into a first chamber 15 and a second chamber 17 fluidly connected to one another. The baffle 20 may include one or more openings 22, 24, 26 and/or a cut-out region 28. The baffle 20 may comprise a substantially flat, plate-like member having a shape that is generally complementary to at least a portion of the cross-section of the tank 12. The baffle 20 may be arranged substantially perpendicular to a substantially-central, longitudinal axis 13 of the tank 12 extending from the first end wall 14 to the second end wall 16. The baffle 20 may be smaller than the cross-section of the tank 12 so as to allow fluid communication between the first chamber 15 and the second chamber 17. In one exemplary embodiment, the baffle 20 may be coupled to the tank 12 by, for example, spot-welding an outer periphery 21 of the baffle 20 to an inner surface 11 of the tank 12. In such an embodiment, the outer periphery 21 of the baffle 20 may include notches (not shown) to provide fluid communication between the first chamber 15 and the second chamber 17.

Alternatively, the baffle 20 may be disposed at a non-perpendicular angle with respect to the longitudinal axis 13 of the tank 12. In such an embodiment, the baffle 20 may not be shaped complementary to the cross-section of the tank 12. For example, if the tank 12 has a circular cross-section and the baffle 20 is not perpendicular to the longitudinal axis 13, the baffle 20 may have an elliptical shape.

The carbonator 10 may also include an opening 30 at the first end wall 14 of the tank 12 configured to receive a flow of water. The opening 30 may be configured as an orifice 32 structured and arranged to direct the flow of water toward the baffle 20. An outlet 34 may also be positioned at the first end wall 14 of the tank 12.

Figure 2:
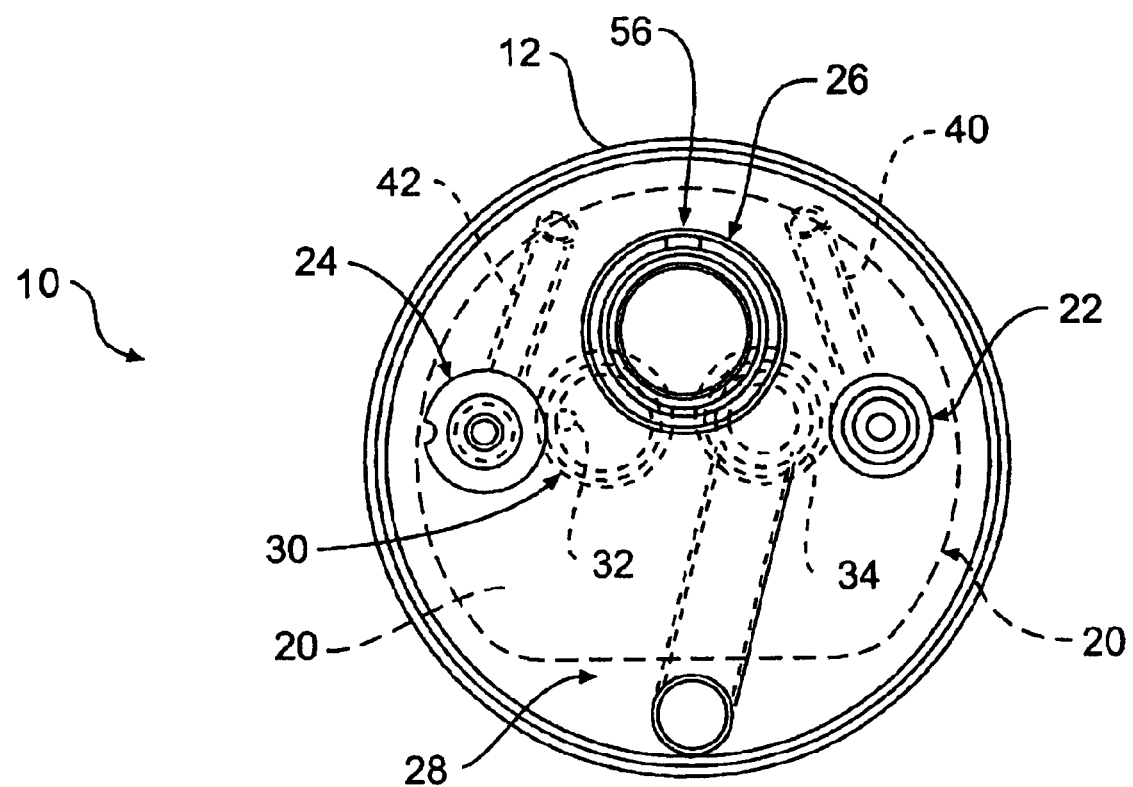
FIG. 2 is an end view of the carbonator of FIG. 1.
Figure 4:
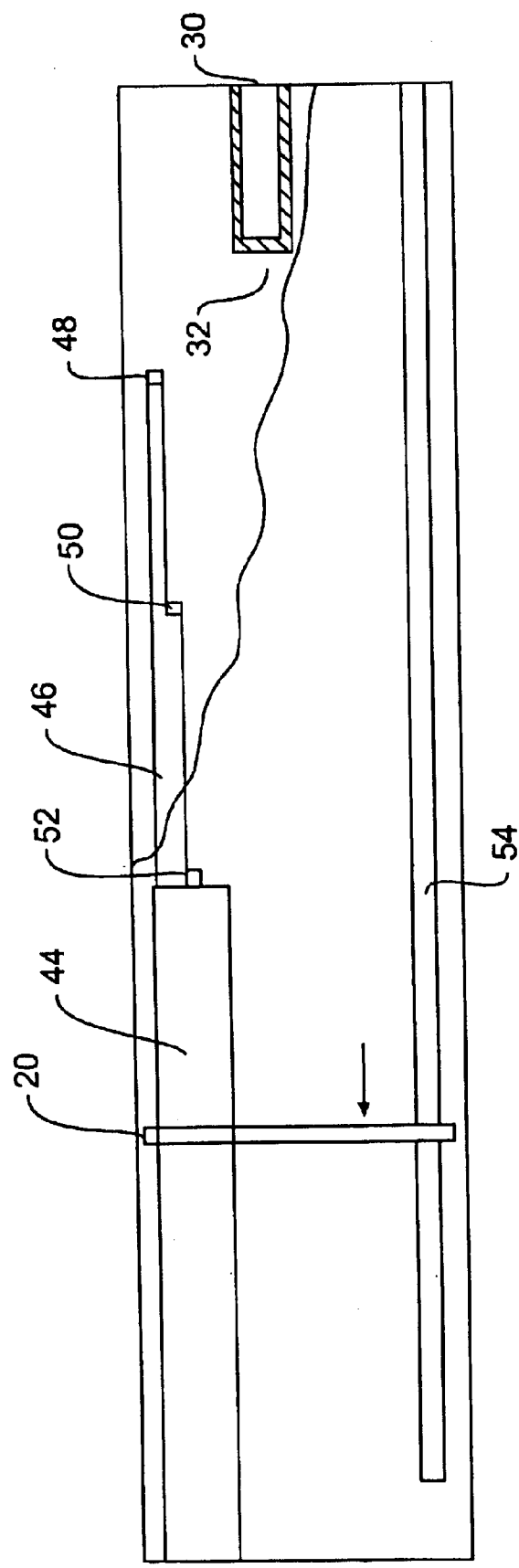
FIG. 4 is a sectional view of a carbonator in accordance with another exemplary aspect of the invention.

Referring to FIG. 2, in an exemplary embodiment of the carbonator 10, the opening 22 may accommodate a $CO_2$ inlet member 40, the opening 24 may accommodate a $CO_2$ pressure relief outlet member 42, and the opening 26 may accommodate a probe housing 44. The inlet and outlet members 40, 42 may be configured, for example, as tubular members extending from the second end wall 16 of the tank 12 toward the first end wall 14. Optionally, the tubular members may each have an angled free end, as shown in FIG. 1. The probe housing 44 may extend from the second end wall 16 of the tank 12 to the baffle 20. Alternatively, the probe housing 44 may extend from the second end wall 16 beyond the baffle 20, as shown in FIG. 4.

The probe housing 44 may house at least a portion of a liquid level probe 46 extending from the second end wall 16 of the tank 12 toward the first end wall 14. For example, the liquid level probe 46 may include a high level sensor 48, a low level sensor 50, and a ground 52. It should be appreciated that the liquid level probe 46 may be configured in any known manner, including with or without a ground. The probe housing 44 and the liquid level probe 46 may be coupled by a keyed arrangement 56 to ensure proper alignment of the liquid level probe within the tank 12. In an exemplary embodiment, the baffle 20 may be coupled, for example, by spot-welding, to the probe housing 44. The baffle 20 may also be adjustably coupled to the probe housing 44 in any known manner such that the baffle 20 may be adjustably positioned at any position along the probe housing 44 to target a desired carbonation level.

The carbonator 10 may include an outlet member 54, for example, an outlet tube, extending from the outlet 34 into the tank 12. In one exemplary embodiment, the outlet member 54 may extend beyond the baffle 20 through the cut-out region 28. The cut-out region 28 may be configured as a chord of the baffle 20 or any other configuration arranged to accommodate the outlet member 54. The outlet member 54 may provide fluid communication between the tank 12 and a customer interface (not shown).

It should be appreciated that the $CO_2$ inlet member 40, the $CO_2$ pressure relief outlet member 42, the probe housing 44, and/or the liquid level probe 46 may extend from the first end wall 14 of the tank 12. It should also be appreciated that the opening 30, the orifice 32, the outlet 34, and/or the outlet member 54 may be disposed at the second end wall 16 of the tank 12.

Figure 3:
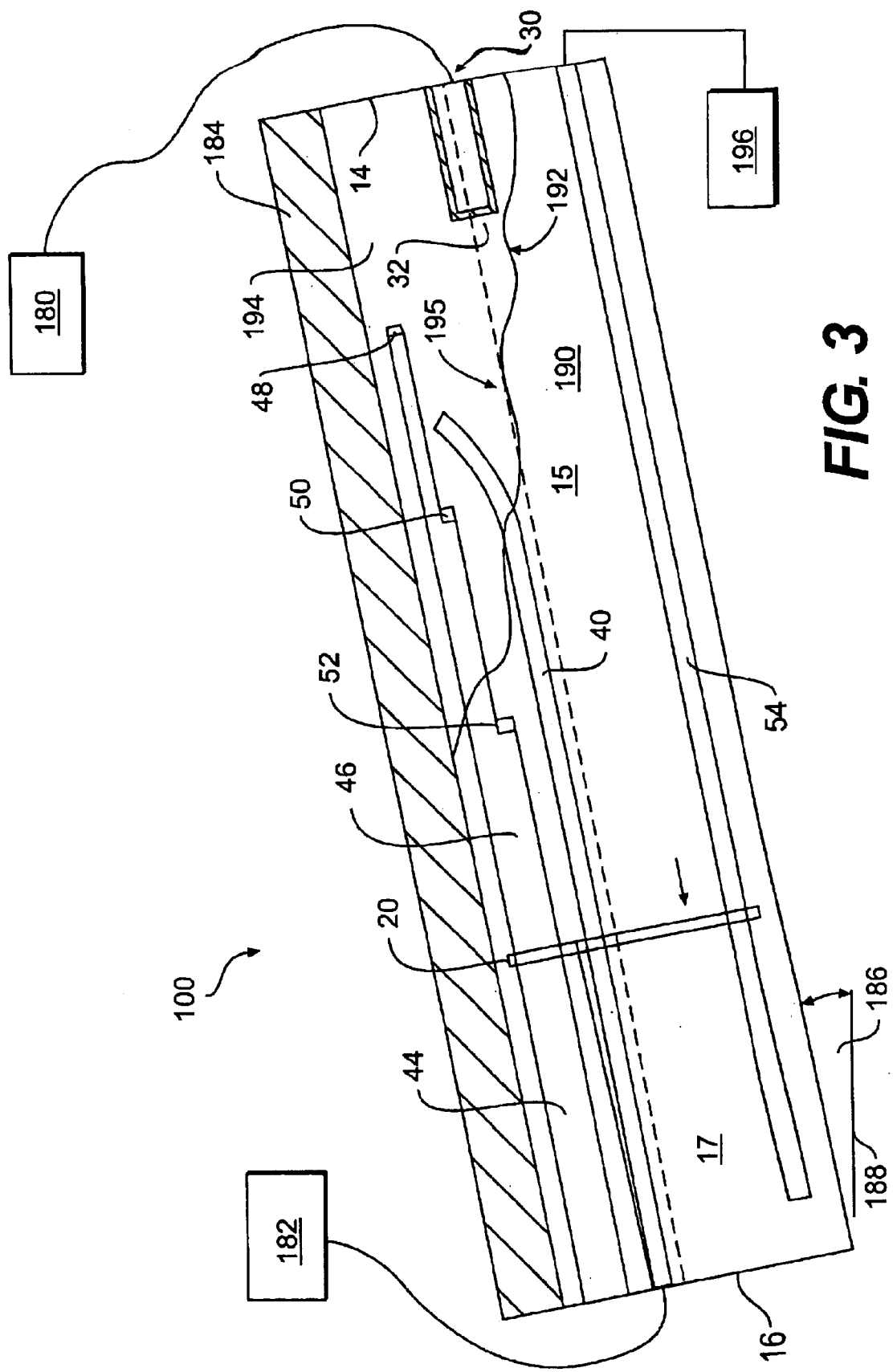
FIG. 3 is a schematic and diagrammatic view of a dispenser system in accordance with an exemplary embodiment of the invention.

Referring to FIG. 3, a beverage system 100 may include a carbonator 10 according to any of the above embodiments. The system 100 may include a supply of liquid, for example, a water supply 180, and a $CO_2$ supply 182. The carbonator 10 may be associated with a cold plate 184 configured to chill the contents of the tank 12 to a desired temperature. The tank 12 may be arranged at an angle 186, for example, an acute angle, with respect to the cold plate 184 and/or a support surface 188. In an exemplary embodiment, the support surface 188 may be the ground and the cold plate 184 may be substantially parallel to the ground. The angle 186 may be, for example, approximately 10°.

The tank 12 may include a liquid 190, for example, water. The water may comprise carbonated water (i.e., soda water) for use in a post-mix beverage dispenser (i.e., a fountain dispenser). As shown in FIG. 3, the arrangement of the tank 12 at the angle 186 provides a surface level 192 of the liquid 190 in the tank forming the same angle 186 with respect to the longitudinal axis of the tank 12. The tank 12 may contain a headspace 194 above the surface level 192 of the liquid 190. The liquid 190 and the headspace 194 may define a liquid-gas interface 195. The system 100 may also include a drink nozzle 196 at the customer interface configured to dispense, for example, a beverage.

In use, a flow of water may be provided from the water supply 180 to the opening 30. From there, the orifice 32 may direct a stream of water through the headspace 194, into the liquid 190, and against the baffle 20. The orifice 32 may be structured and arranged such that the flow of water entrains $CO_2$ bubbles while being injected into the liquid 190 to achieve a desired carbonation level of the liquid 190. The configuration, for example, the size, shape, location, and the like, of the orifice 32 may be modified to achieve the desired carbonation level. The $CO_2$ inlet member 40 may provide fluid communication between the $CO_2$ supply 182 and the headspace 194 of the tank 12, and the pressure relief member 42 may prevent over-pressurization of the headspace 194 and, in turn, the liquid 190.

The baffle 20 may be arranged and positioned in the tank 12 so as to achieve a desired carbonation level. That is, the baffle 20 may be moved to different positions along the longitudinal axis 13 to target different desired carbonation levels. The different positions of the baffle 20 vary the ratio between the size of the first chamber 15 and the size of the second chamber 17. The baffle 20 may be arranged such that the relatively larger size $CO_2$ bubbles will remain in the first chamber (or whatever side of the baffle 20 receives the stream of water from the orifice 32). Some smaller $CO_2$ bubbles may flow past the baffle 20, but may be absorbed into the liquid 190 before flowing into the outlet member 54. Any $CO_2$ bubbles that may escape into the outlet member 54 will not generally result in valve sputtering at the drink nozzle 196 of the customer interface and/or excessive foaming in the beverage.

The baffle 20 may also be positioned in the tank 12 and configured such that when the surface level 192 of the liquid 190 drops to a certain level, the stream of water from the orifice 32 impacts the baffle 20 in a manner that atomizes the stream of water into smaller droplets. As a result, the targeted desired carbonation level may be more readily achieved.

Further, the baffle 20 may also be positioned in the tank 12 and configured such that when the surface level 192 of the liquid 190 drops to or below a level associated with the low level sensor 50, surfaces of the baffle 20 may agitate the liquid 190 to maintain the desired carbonation level. Consequently, the resulting beverage may be more properly carbonated regardless of the surface level 192 of liquid 190 in the tank 12.

The liquid level probe 46 may operate in a well-known manner. For example, the high level sensor 48 may detect when the level 192 of liquid 190 in the tank 12 reaches a first predetermined level and the low level sensor 50 may detect when the level 192 of liquid 190 reaches a second predetermined level. When the liquid level 192 reaches the first predetermined level, the high level sensor 48 may send a signal to a controller (not shown), which, in turn, controls operation of a valving device (not shown), for example, a control valve, and/or a pump (not shown) to stop the flow of water into the tank 12. Similarly, when the liquid level 192 reaches a second predetermined level, the low level sensor 50 may send a signal to the controller, which, in turn, controls operation of the valving device and/or the pump to supply a flow of water to the tank 12.

The outlet member 54 provides fluid communication between the tank 12 and the drink nozzle via the outlet. As is well-known in the art, the carbonated water from the tank 12 may be mixed with a syrup, or concentrate, from one or more syrup supplies (not shown) according to a request from, for example, a user interface to form a drink desired by a consumer. The beverage dispenser may include a controller (not shown) that processes the request, activates a pump (not shown) to draw carbonated water from the tank, and determines the ratio of syrup to carbonated water. The drink may be dispensed through the drink nozzle associated with the beverage dispenser.

It will be apparent to those skilled in the art that various modifications and variations can be made to the structure and methodology of the present invention without departing from the scope or spirit of the invention. Thus, it should be understood that the invention is not limited to the examples discussed in the specification. Rather, the present invention is intended to cover modifications and variations of this invention.

What is claimed is:

1. A system for mixing water with $CO_2$ to produce carbonated water at a targeted carbonation level, the system comprising:

a tank containing water and a headspace, the tank having a first end and a second end;

a source of $CO_2$ in fluid communication with the headspace;

a baffle in the tank between the first end and the second end;

an orifice in the first end of the tank; and a supply of water coupled to the orifice, the orifice being structured and arranged to direct a stream of water into the tank, wherein the tank is arranged at an acute angle with respect to a support surface, and wherein the baffle is positioned in the tank so as to target a desired carbonation level of the water in the tank.

2. The system of claim 1, further comprising an outlet at the first end of the tank.

3. The system of claim 2, wherein an outlet tube extends from the first end past the baffle, and wherein the baffle includes a cutout region structured and arranged to accommodate the outlet tube.

4. The system of claim 1, further comprising a $CO_2$ inlet member and a pressure relief member each extending from the second end through the baffle.

5. The system of claim 4, wherein the baffle includes at least one opening configured to receive at least one of the $CO_2$ inlet member and the pressure relief member.

6. The system of claim 1, further comprising:

a probe housing extending from the second end of the tank toward the baffle;

a liquid level probe in the probe housing, the liquid level probe extending through the baffle and toward the first end.

7. The system of claim 6, wherein the baffle is coupled to the probe housing.

8. The system of claim 6, wherein the baffle includes an opening structured and arranged to accommodate the liquid level probe.

9. The system of claim 8, wherein the probe housing extends through the opening in the baffle and toward the first end of the tank.

10. The system of claim 1, wherein the baffle is structured and arranged so as to atomize the stream of water when the level of the carbonated water reaches a predetermined low level.

11. The system of claim 1, wherein the baffle is structured and arranged so as to agitate carbonated water flowing by the baffle when the level of the carbonated water reaches a predetermined low level.

12. The system of claim 1, wherein the orifice is configured to direct the stream of water such that $CO_2$ bubbles are entrained to produce the targeted carbonation level of the water.

13. A carbonator for use in a beverage dispenser, comprising:

a tank having a first end and a second end, the tank being configured to contain water;

an inlet in the second end of the tank configured to receive a supply of $CO_2$;

a baffle in the tank between the first end and the second end; and an orifice in the first end of the tank, the orifice being structured and arranged to direct a stream of water into the tank, wherein the baffle is positioned in the tank so as to target a desired carbonation level of the water in the tank.

14. The carbonator of claim 13, further comprising an outlet at the first end of the tank.

15. The carbonator of claim 14, wherein an outlet tube extends from the first end past the baffle, and wherein the baffle includes a cutout region structured and arranged to accommodate the outlet tube.

16. The carbonator of claim 13, further comprising a $CO_2$ inlet member and a pressure relief member each extending from the second end through the baffle.

17. The carbonator of claim 16, wherein the baffle includes at least one opening configured to receive at least one of the $CO_2$ inlet member and the pressure relief member.

18. The carbonator of claim 13, further comprising:
- a probe housing extending from the second end of the tank toward the baffle;
- a liquid level probe in the probe housing, the liquid level probe extending through the baffle and toward the first end.

19. The carbonator of claim 18, wherein the baffle is coupled to the probe housing.

20. The carbonator of claim 18, wherein the baffle includes an opening structured and arranged to accommodate the liquid level probe.

21. The carbonator of claim 20, wherein the probe housing extends through the opening in the baffle and toward the first end of the tank.

22. The carbonator of claim 13, wherein the baffle is structured and arranged so as to atomize the stream of water when the level of the carbonated water reaches a predetermined low level.

23. The carbonator of claim 13, wherein the baffle is structured and arranged so as to agitate carbonated water flowing by the baffle when the level of the carbonated water reaches a predetermined low level.

24. The carbonator of claim 13, wherein the orifice is configured to direct the stream of water such that $CO_2$ bubbles are entrained to produce a desired carbonation of the water.

25. The system of claim 1, wherein said acute angle is approximately 10 degrees.

* * * * *